United States Patent [19]

Banks

[11] Patent Number: 5,358,152
[45] Date of Patent: Oct. 25, 1994

[54] DETERGENT DOSER

[75] Inventor: Stewart Banks, Brantford, Canada

[73] Assignee: Sprintvest Corporation NV, Netherlands Antilles

[21] Appl. No.: 101,191

[22] Filed: Aug. 3, 1993

[51] Int. Cl.⁵ .......................... B67D 5/64; G01F 11/26
[52] U.S. Cl. ................................ 222/442; 222/158; 222/454; 222/463; 222/519; 222/521
[58] Field of Search ............... 222/158, 207, 442, 454, 222/463, 519, 521; 141/319–322, 325; 68/17 R, 17 A

[56] References Cited

U.S. PATENT DOCUMENTS

| | | | |
|---|---|---|---|
| 2,133,679 | 10/1938 | Woeltjen | 222/442 |
| 2,570,745 | 10/1951 | Arnold | 141/322 |
| 3,259,282 | 7/1966 | Jellesen | 222/521 |
| 4,607,762 | 8/1986 | Zulauf et al. | 222/521 X |
| 4,703,872 | 11/1987 | Cornette et al. | 222/158 |
| 4,875,600 | 10/1989 | D'Hoogue et al. | 222/454 X |
| 4,883,203 | 11/1989 | Kittscher | 222/463 X |
| 4,893,726 | 1/1990 | Vesborg | 222/158 X |
| 4,951,839 | 8/1990 | Kong | 222/454 X |
| 5,246,148 | 9/1993 | Slat et al. | 222/454 |

FOREIGN PATENT DOCUMENTS 302793  11/1932  Italy ........................... 222/442

Primary Examiner—Kevin P. Shaver
Attorney, Agent, or Firm—Ladas & Parry

[57] ABSTRACT

The present invention provides a detergent doser for dispensing liquid doses from a liquid dispenser. The liquid dispenser has a nozzle through which the detergent is dispensed. The detergent doser includes a container having an outer wall and an inner wall defining therebetween a chamber. The doser is provided with a passageway extending through the container defined by the inner wall for receiving therein the nozzle. The inner wall includes an aperture and the doser is movable with respect to the nozzle between a closed position in which the nozzle outlet is closed off by a portion of the inner wall and an open position in which the nozzle outlet and aperture cooperate to provide a fluid flow path between the dispenser and chamber. In the closed position the detergent doser acts as a lid or cap for the dispenser.

8 Claims, 2 Drawing Sheets

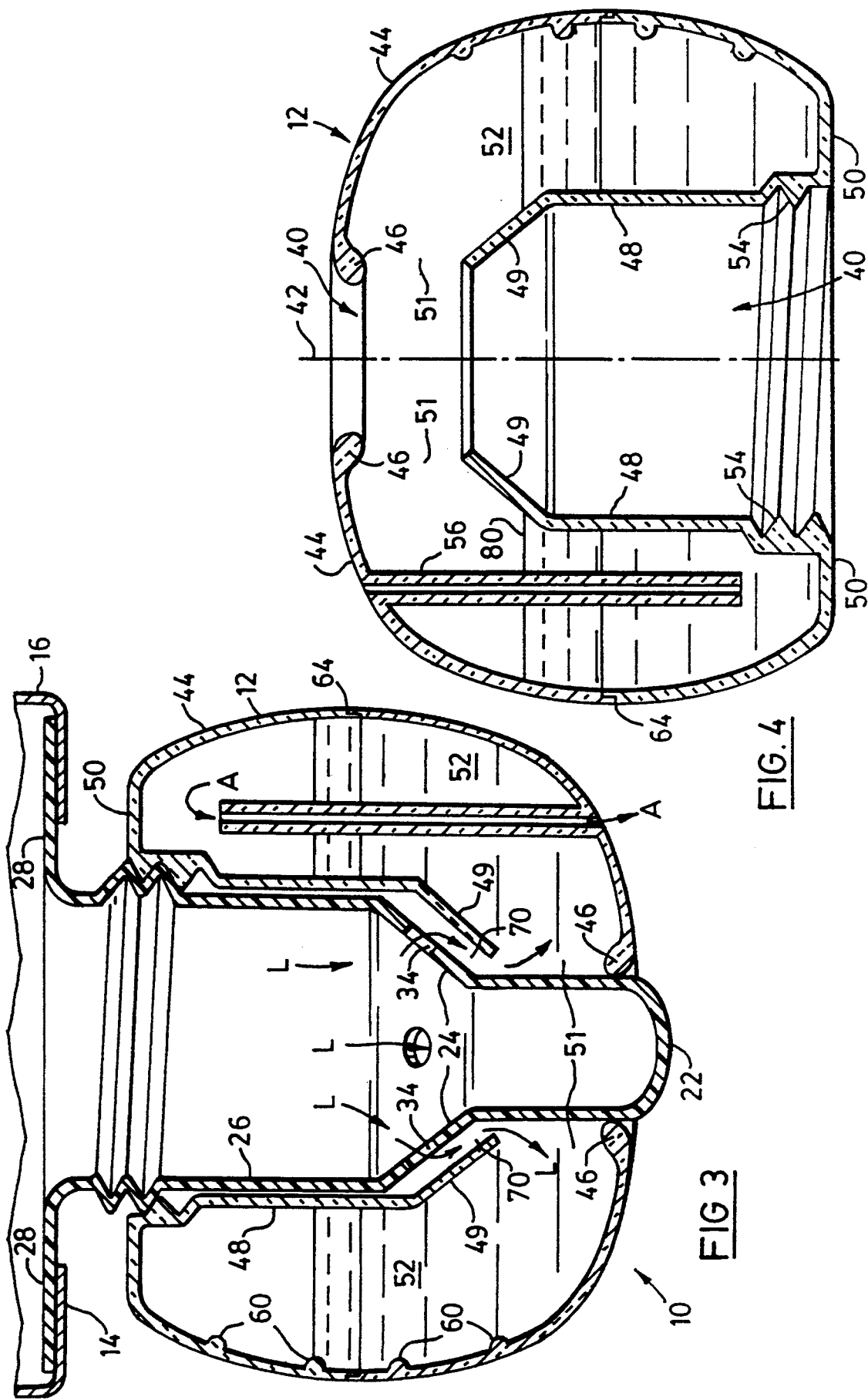

DETERGENT DOSER

FIELD OF THE INVENTION present invention relates to a device for providing measured amounts of liquid from a liquid dispenser.

BACKGROUND OF THE INVENTION

Many cleaning applications such as laundry, floor cleaning and other household chores require the use of liquid detergents. Predetermined amounts of liquid detergent are usually premixed with specified volumes of water in order to prepare the cleaning solution. One known method of measuring predetermined amounts of detergent includes providing a measuring cup or the like with the detergent dispenser. The measuring cup usually comes as a separate unit which is either contained within the packaging with the liquid dispenser or is attached directly to the detergent bottle by means of a friction fit. A drawback to this arrangement is that the measuring cup can be lost or misplaced when not in use, or alternatively, the dispenser cap may become lost or misplaced when the liquid is being dispensed into the measuring cup.

Therefore, it is advantageous to provide a detergent dispenser which includes a measuring cup which can also serve the role of a closure member so as to eliminate the need for a separate cap.

SUMMARY OF THE INVENTION

The present invention provides in one aspect a device for measuring liquid doses from a liquid dispenser having a nozzle provided with a nozzle outlet. The device comprises a container having an outer wall and an inner wall defining therebetween a chamber. The device includes a passageway extending through the container defined by the inner wall for receiving therein the nozzle. The inner wall includes means defining an aperture and the container is movable with respect to the nozzle between a closed position in which the nozzle outlet is closed off by a portion of the inner wall and an open position in which the nozzle outlet and aperture cooperate to provide a fluid flow path between the dispenser and chamber. The container includes air vent means for venting air from the chamber as liquid flows into the chamber from the liquid dispenser.

In another aspect of the invention there is provided a device for measuring doses of liquids. The device comprises a liquid dispenser having a nozzle provided with a nozzle outlet. Included is a container having an outer wall and an inner wall defining therebetween a chamber. A passageway extends through the container defined by the inner wall for receiving therein the nozzle. The inner wall includes means defining an aperture and the container is movable with respect to the nozzle between a closed position in which the nozzle outlet is closed off by a portion of the inner wall and an open position in which the nozzle outlet and aperture cooperate to provide a liquid flow path between said dispenser and the chamber. The container is provided with air vent means for venting air from the chamber as liquid flows into the chamber from the liquid dispenser.

BRIEF DESCRIPTION OF THE DRAWINGS

The detergent doser forming the present invention will now be described, by example only, reference being had to the accompanying drawings, in which:

FIG. 3 is a view similar to FIG. 2 but with the detergent doser in the open position and liquid being dispensed into the doser; and FIG. 4 is a sectional elevation view of the detergent doser with a liquid charge contained therein.

DETAILED DESCRIPTION OF THE INVENTION

Figure 1:
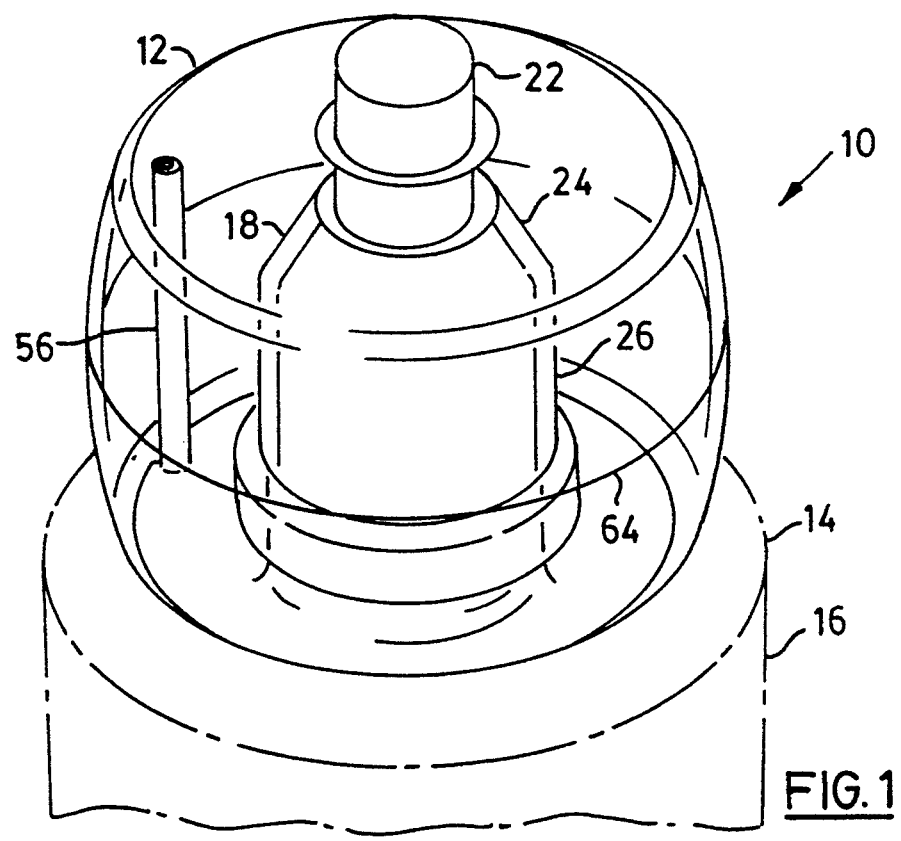
FIG. 1 is a perspective view, broken away, of a detergent doser embodying the subject invention attached to a liquid dispenser.
Figure 2:
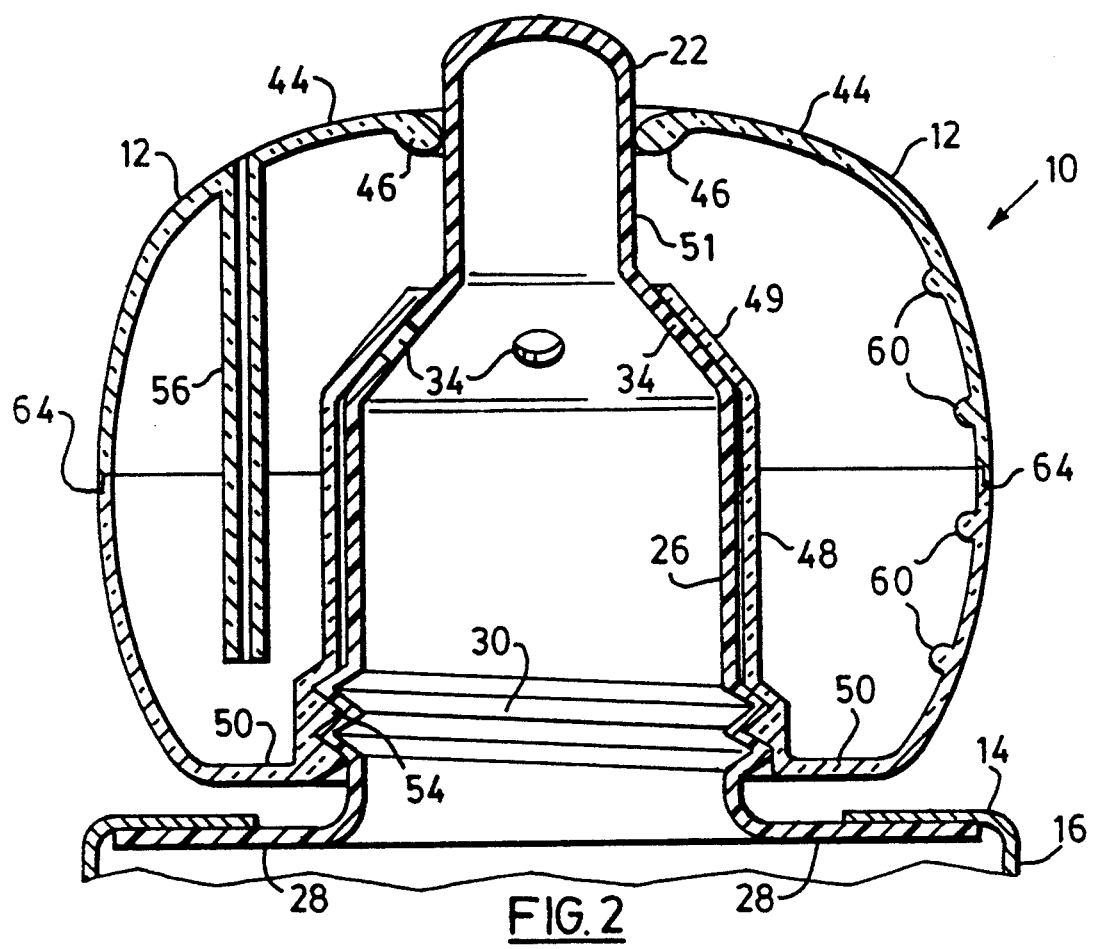
FIG. 2 is a sectional elevation view, broken away, of the detergent doser and dispenser of FIG. 1 in the closed position.

Referring to FIGS. 1 and 2, shown generally at 10 is a combination detergent doser 12 and a liquid dispenser 14. Liquid dispenser 14 includes a plastic bottle 16 for liquid detergents and the like and an outlet nozzle 18 attached to the container portion.

Referring specifically to FIG. 9., nozzle 18 includes a first cylindrical section 22, a second cylindrical section 26 having a diameter greater than first section 22, and a tapered or frusto-conically shaped section 24 extending between the cylindrical sections. Nozzle 18 includes an annular shoulder 28 extending from cylindrical section 26 and the nozzle includes external threads 30 circumferentially disposed about cylindrical portion 26 spaced from the shoulder. Shoulder 28 of nozzle 18 is secured to bottle 16 at 32 using known bonding techniques during fabrication of the liquid dispenser. Tapered section 24 includes a plurality of holes 34 spaced circumferentially thereabout for providing a liquid flow path from the bottle interior. Those skilled in the art will readily appreciate that bottle 16 and nozzle 18 may be of one piece unitary construction.

Referring to FIG. 4, the assembled detergent doser 12 is a generally cylindrical, donut shaped container provided with a passage 40 extending along a cylindrical axis 42. Doser 12 includes a cylindrical outer wall 44 terminating at a thickened annular collar 46 at the top end and a cylindrical inner wall 48 with the outer and inner walls connected along an annular section 50 located at the bottom end. Inner wall 48 terminates in a frusto-conically shaped portion 49 tapered at about the same angle as section 24 of nozzle 18. Walls 44 and 48 and section 50 define a liquid storage compartment 52. A gap between the end of section 49 and collar 46 defines an aperture 51 to provide access to compartment 52. Doser 12 is provided with an inner threaded portion 54 circumferentially disposed on inner wall 48 adjacent annular section 50.

Doser 12 includes an air vent in the shape of a tube 56 integrally formed with outer wall 44 and extending into storage compartment 52 parallel to axis 42. Tube 56 extends from the top end of doser 12 and terminates at a point spaced above the bottom portion. Tube 56 provides air flow communication between the interior and exterior of doser 12. Outer wall 44 includes a plurality of spaced ribs 60 molded therewith and extending circumferentially about the interior surface for providing a liquid level indication.

In the embodiment shown, doser 12 is fabricated of clear, flexible plastic molded in two sections, the first section including inner wall 48, annular section 50 and a portion of outer wall 44 adjacent section 50; the second section comprising the remaining portion of outer wall 44. The two sections are connected together along a circumferential line 64 by ultrasonic welding for example.

Referring to FIGS. 1 and 2, detergent doser 12 is dimensioned to form a tight fit with nozzle 18 so that cylindrical portion 22 forms a substantially liquid tight friction fit with collar 46. Threads 30 of nozzle 18 are matched to receive threads 54 of doser 12 thereby securing the latter to the former. When doser 12 is threaded tightly down onto nozzle 18, inner wall 48 is adjacent cylindrical portion 26 of the nozzle and frustoconical section 49 is tightly held against tapered portion 24 of the nozzle thereby sealing off holes 34. Section 22 of nozzle 18 is sufficiently long so that a tight seal is maintained between it and collar 46 when doser 12 is partially unthreaded to receive therein the charge of liquid.

In operation, in order to dispense the liquid from dispenser 14, detergent doser 12 is slightly unthreaded on nozzle 18 so that tapered section 49 of inner wall 48 is spaced from tapered section 24 of the nozzle defining a gap 70 therebetween, see FIG. 3. Dispenser 14 is turned upside down so that liquid in bottle 16 flows from the dispenser through nozzle 18 and through holes 34 in the direction of arrows L into chamber 52 of doser 12. As liquid flows into doser 19., the air in chamber 52 is displaced out of the chamber through tube 56 in the direction of arrows A.

Liquid is dispensed into doser 12 until the desired quantity has been obtained, indicated by for example graduated liquid level lines or other markings on the plastic doser. Once a sufficient amount of fluid in doser 12 has been obtained, dispenser 14 is turned upright and the doser threadably removed from nozzle 18. It will be appreciated that tube 56 is of sufficient length and terminates adjacent collar 46 on the upper part of wall 44 so that chamber 59 can be substantially filled without liquid escaping through the vent when either upside down or right side up.

FIG. 4 illustrates doser 12 partially filled with fluid up to a level indicated by the numeral 80. For cleaning applications in which the liquid is a detergent, doser 12 may then placed in a washing machine whereby the detergent is expelled from the doser during agitation in the wash. By being fabricated of flexible plastic, doser 12 can withstand multiple exposures to the rigorous environment of the washing machine without damage.

It will be appreciated that detergent doser 12, being fabricated of plastic, may be readily recycled after the contents of bottle 16 have been consumed.

Those skilled in the art will appreciate that structural details of the doser and nozzle may vary considerably from the embodiment shown herein; the important features being that the doser and nozzle cooperate to provide a closure member to prevent leaking from the container and that a predetermined amount of liquid may be dispensed from the container into the doser without spillage.

For example, nozzle 18 as illustrated and described includes holes 34 left open when doser 12 has been removed from bottle 16. An alternative nozzle may be employed comprising a closure feature for blocking off holes 34 after removal of doser 12 from the bottle. Specifically, such a nozzle may be of two part construction with each part having holes which can be aligned by movement of one part of the nozzle with respect to the other part.

Therefore, while the present invention has been described and illustrated with respect to the preferred embodiment, it will be appreciated that numerous variations of this embodiment may be made without departing from the scope of the invention.

What is claimed is:

1. A device for measuring liquid doses from a liquid dispenser having a nozzle provided with a nozzle outlet, comprising:
    a container having an outer wall and an inner wall defining therebetween a chamber, a passageway extending through said container defined by said inner wall for receiving therein said nozzle, the inner wall including means defining an aperture, the container being movable with respect to said nozzle between a closed position in which said nozzle outlet is closed off by a portion of the inner wall and an open position in which said nozzle outlet and aperture cooperate to provide a liquid flow path between said dispenser and said chamber, and said container including air vent means for venting air from said chamber as liquid flows into said chamber from said liquid dispenser.

2. A device according to claim 1 wherein said inner wall has a cylindrical portion and includes an inner circumferential threaded portion adapted to threadably receive a threaded portion on said nozzle, said nozzle outlet being closed off when said container is threaded down all the way onto the nozzle and said nozzle outlet and said aperture being aligned when said container is partially threaded onto said nozzle.

3. A device according to claim 2 wherein said container is fabricated of flexible, molded plastic.

4. A device according to claim 2 wherein said container has a top portion and a bottom portion, the bottom portion being adjacent a top portion of the liquid dispenser when the container is assembled with the nozzle, wherein said air vent means comprises a tube extending from substantially the top portion of said container to the bottom portion thereof.

5. A device for measuring doses of liquids, comprising, in combination;
    a) a liquid dispenser having a nozzle provided with a nozzle outlet; and
    b) a container having an outer wall and an inner wall defining therebetween a chamber, a passageway extending through said container defined by said inner wall for receiving therein said nozzle, the inner wall including means defining an aperture, the container being movable with respect to said nozzle between a closed position in which said nozzle outlet is closed off by a portion of the inner wall and an open position in which said nozzle outlet and aperture cooperate to provide a liquid flow path between said liquid dispenser and said chamber, and said container including air vent means for venting air from said chamber as liquid flows into said chamber from said liquid dispenser.

6. A device according to claim 5 wherein said inner wall has a cylindrical portion and includes an inner circumferential threaded portion adapted to threadably receive a threaded portion on said nozzle, said nozzle outlet being closed off when said container is threaded down all the way onto the nozzle and said nozzle outlet and said aperture being aligned when said container is partially threaded onto said nozzle.

7. A device according to claim 6 wherein said container is fabricated of flexible, molded plastic.

8. A device according to claim 6 wherein said container has a top portion and a bottom portion, the bottom portion being adjacent a top portion of the liquid dispenser when the container is assembled with the nozzle, wherein said air vent means comprises a tube extending from substantially the top portion of said container to the bottom portion thereof.

* * * * *